United States Patent
Klittich et al.

(10) Patent No.: US 12,527,324 B2
(45) Date of Patent: Jan. 20, 2026

(54) 5-FLUORO-4-IMINO-3-(ALKYL/SUBSTITUTED ALKYL)-1-(ARYLSULFONYL)-3,4-DIHYDROPYRIMIDIN-2(1H)-ONE AS A SEED TREATMENT

(71) Applicant: Adama Makhteshim Ltd., Beer Sheva (IL)

(72) Inventors: Carla J.R. Klittich, Indianapolis, IN (US); Chenglin Yao, Indianapolis, IN (US); W. John Owen, Carmel, IN (US)

(73) Assignee: ADAMA MAKHTESHIM LTD., Beer Sheva (IL)

( * ) Notice: Subject to any disclaimer, the term of this patent is extended or adjusted under 35 U.S.C. 154(b) by 884 days.

(21) Appl. No.: 17/552,124

(22) Filed: Dec. 15, 2021

(65) Prior Publication Data
US 2022/0104489 A1 Apr. 7, 2022

Related U.S. Application Data

(62) Division of application No. 15/537,940, filed as application No. PCT/US2015/066756 on Dec. 18, 2015, now abandoned.

(60) Provisional application No. 62/096,301, filed on Dec. 23, 2014.

(51) Int. Cl.
A01N 43/54 (2006.01)
A01C 1/06 (2006.01)
C07D 239/47 (2006.01)

(52) U.S. Cl.
CPC ............ *A01N 43/54* (2013.01); *A01C 1/06* (2013.01); *C07D 239/47* (2013.01)

(58) Field of Classification Search
CPC ......... A01N 43/54; C07D 239/47; A01C 1/06
See application file for complete search history.

(56) References Cited

U.S. PATENT DOCUMENTS

| | | | | |
|---|---|---|---|---|
| 7,098,170 B2* | 8/2006 | Asrar | ..................... | A01N 55/00 504/270 |
| 7,807,714 B2* | 10/2010 | Brandl | ..................... | A01N 43/36 514/533 |
| 9,526,245 B2* | 12/2016 | Owen | ..................... | A01N 47/14 |
| 9,532,570 B2* | 1/2017 | Owen | ..................... | A01N 47/14 |
| 10,045,533 B2* | 8/2018 | Owen | ..................... | A01N 43/54 |
| 10,045,534 B2* | 8/2018 | Owen | ..................... | A01N 43/653 |
| 10,051,862 B2* | 8/2018 | Owen | ..................... | A01N 43/88 |
| 10,426,165 B2* | 10/2019 | Owen | ..................... | A01N 47/14 |
| 10,426,166 B2* | 10/2019 | Owen | ..................... | A01N 43/54 |
| 10,426,167 B2* | 10/2019 | Owen | ..................... | A01N 37/34 |
| 2011/0263627 A1 | 10/2011 | Boebel et al. | | |

FOREIGN PATENT DOCUMENTS

WO WO 2014/105845 7/2014

OTHER PUBLICATIONS

PCT International Search Report issued Feb. 25, 2016 in connection with PCT International Application No. PCT/US2015/066756.
Written Opinion of the International Searching Authority issued Feb. 25, 2016 in connection with PCT International Application No. PCT/US2015/066756.

* cited by examiner

*Primary Examiner* — Ali Soroush
*Assistant Examiner* — Andriae M Holt
(74) *Attorney, Agent, or Firm* — Gary J. Gershik

(57) ABSTRACT

The present disclosure relates to the use of a compound of Formula I as a seed treatment to prevent or control plant diseases.

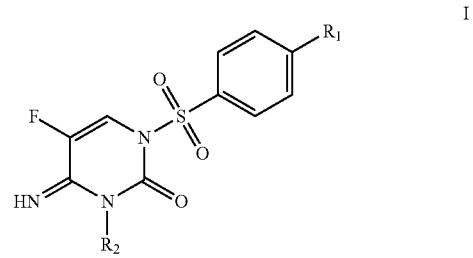

20 Claims, No Drawings

5-FLUORO-4-IMINO-3-(ALKYL/SUBSTITUTED ALKYL)-1-(ARYLSULFONYL)-3,4-DIHYDROPYRIMIDIN-2(1H)-ONE AS A SEED TREATMENT

CROSS REFERENCE TO RELATED APPLICATIONS

This application is a divisional of U. S. Ser. No. 15/537,940, filed Jun. 20, 2017, which is a § 371 national stage of PCT International Application No. PCT/US2015/066756, filed Dec. 18, 2015, claiming the benefit of U.S. Provisional Application No. 62/096,301, filed Dec. 23, 2014, the contents of each of which are hereby incorporated by reference into the application.

FIELD

The present disclosure relates to methods of controlling phytopathogenic fungi by treating seeds with a novel seed treatment fungicide.

BACKGROUND

In agriculture, seed treatments or seed dressings have been used to treat seeds prior to planting. The term "seed treatment" includes all suitable seed treatment techniques known in the art, such as seed dressing, seed coating, seed dusting, seed imbibition (soaking), seed foaming (i.e. covering in foam) and seed pelleting, and refers preferably to the application of a fungicidally active compound(s) directly to the seeds themselves, prior to planting, and/or in their immediate vicinity during planting.

SUMMARY

An embodiment of the present disclosure may include a method for the control or prevention of fungal attack on a plant, the method including the steps of applying a fungicidally effective amount of a compound of Formula I to a seed adapted to produce the plant.

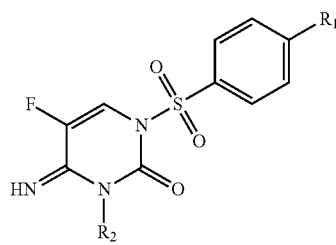

One aspect of the present disclosure is a method for controlling phytopathogenic fungi in and/or on a plant, wherein the seeds, from which the plant is expected to grow, before sowing and/or after pregermination, are treated with a compound of Formula I, wherein: $R_1$ is selected from H, $C_1$-$C_6$ alkyl, and $C_1$-$C_6$ alkoxy, and $R_2$ is selected from $C_1$-$C_6$ alkyl, phenyl, benzyl, and —$CH_3$-thiophenyl.

In one exemplary embodiment, a method of treating a plant seed to produce a plant resistant to fungal attack, wherein the plant seed is treated with a compound of Formula I. In a more particular embodiment, $R_1$ and $R_2$ are independently selected from $C_1$-$C_6$ alkyl. In an even more particular embodiment, $R_1$ and $R_2$ are each —$CH_3$.

In another more particular embodiment of any of the above embodiments, the compound of Formula I is applied at a rate from about 0.5 to about 500 grams per 100 kilograms of seed.

In another more particular embodiment of any of the above embodiments, the seed being treated is a wheat seed (*Triticum* sp.; TRZSS).

In another more particular embodiment of any of the above embodiments, the fungal pathogen is selected from the group consisting of the causal agent of wheat leaf blotch (*Zymoseptoria tritici*), leaf spot of sugar beets (*Cercospora beticola*), and leaf spot of peanut (*Cercospora arachidicola* and *Cercosporidium personatum*).

In another embodiment, a plant seed adapted to produce a plant resistant to fungal and insect attack is provided. In one exemplary embodiment, the plant seed is treated with a compound of Formula I and one or more insecticides. In a more particular embodiment, $R_1$ and $R_2$ are each —$CH_3$.

In another embodiment, a plant seed adapted to produce a plant resistant to fungal and insect attack is provided. In one exemplary embodiment, the plant seed is treated with a compound of Formula I and one or more fungicides. In a more particular embodiment, $R_1$ and $R_2$ are each —$CH_3$.

In another embodiment, a plant seed adapted to produce a plant resistant to fungal and insect attack is provided. In one exemplary embodiment, the plant seed is treated with a compound of Formula I and one or more insecticides. In a more particular embodiment, $R_1$ and $R_2$ are each —$CH_3$.

In another embodiment, a plant seed adapted to produce a plant resistant to fungal attack is provided. The plant seed is treated with a compound of Formula I and one or more additional health stimulators selected from the group consisting of organic compounds, inorganic fertilizers or micronutrient donors, biocontrol agents and inoculants. In a more particular embodiment, $R_1$ and $R_2$ are each —$CH_3$.

In another embodiment, a method of treating a plant seedling to produce a plant resistant to fungal attack is provided. The plant seedling is treated with a compound of Formula I. In a more particular embodiment, $R_1$ and $R_2$ are each —$CH_3$. In another more particular embodiment of any of the above embodiments, the seedling is a seedling of wheat (*Triticum* sp.; TRZSS). In another more particular embodiment of any of the above embodiments, the fungal pathogen is selected from the group consisting of the causal agent of wheat leaf blotch (*Zymoseptoria tritici*), leaf spot of sugar beets (*Cercospora beticola*), and leaf spot of peanut (*Cercospora arachidicola* and *Cercosporidium personatum*).

In another embodiment, a plant seedling adapted to produce a plant resistant to fungal and insect attack is provided. In one exemplary embodiment, the plant seedling is treated with a compound of Formula I and one or more insecticides. In a more particular embodiment, $R_1$ and $R_2$ are each —$CH_3$.

In another embodiment, a plant seedling adapted to produce a plant resistant to fungal and insect attack is provided. In one exemplary embodiment, the plant seedling is treated with a compound of Formula I and one or more fungicides. In a more particular embodiment, $R_1$ and $R_2$ are each —$CH_3$.

In another embodiment, a plant seedling adapted to produce a plant resistant to fungal and insect attack is provided. In one exemplary embodiment, the plant seedling is treated with a compound of Formula I and one or more insecticides. In a more particular embodiment, $R_1$ and $R_2$ are each —$CH_3$.

In another embodiment, a plant seedling adapted to produce a plant resistant to fungal attack is provided. The plant seedling is treated with a compound of Formula I and one or more additional health stimulators selected from the group consisting of organic compounds, inorganic fertilizers or micronutrient donors, biocontrol agents and inoculants. In a more particular embodiment, $R_1$ and $R_2$ are each —$CH_3$.

In another embodiment, a plant seedling adapted to produce a plant resistant to fungal attack. The plant seedling is treated with a compound of Formula I. In a more particular embodiment, $R_1$ and $R_2$ are each —$CH_3$.

In another embodiment, a method of protecting a plant from fungal attack is provided. The method comprises applying a compound of Formula I to the seedling environment. In a more particular embodiment, the compound of Formula I is provided as a liquid formulation. In another more particular embodiment, the compound of Formula I is provided as a solid formulation.

Additional features and advantages of the present disclosure will become apparent to those skilled in the art upon consideration of the following detailed description of the illustrative embodiments exemplifying the best mode of carrying out the utility described herein as presently perceived.

DETAILED DESCRIPTION OF THE DISCLOSURE

The embodiments of the disclosure described herein are not intended to be exhaustive or to limit the disclosure to the precise forms disclosed. Rather, the embodiments selected for description have been chosen to enable one skilled in the art to practice the disclosure.

Seed treatment can independently include application of a compound of Formula I directly to the seed as a coating or application to the seed environment as a liquid or solid formulation. Additionally, a compound of Formula I may be applied as a liquid or solid formulation to a seedling environment.

A seed is broadly interpreted to include anything that can be sown and can potentially be set in place (soil) to grow a crop. The term "seed" embraces seeds and plant propagules of all kinds including, but not limited to, true seeds, seed pieces, grains, suckers, corms, bulbs, fruit, tubers, cuttings, cut shoots and similar forms, and preferably means a true seed.

A seedling is a germinated seed.

A seedling environment is the soil or other growth medium surrounding the seedling.

The present disclosure contemplates all vehicles by which a compound of Formula I can be formulated for delivery and use as a seed treatment fungicide. Conventional seed treatment formulations include for example flowable concentrates, solutions, powders for dry treatment, water dispersible powders for slurry treatment, water-soluble powders and emulsion and gel formulations. These formulations can be applied diluted or undiluted.

Typically, formulations are applied following dilution of the concentrated formulation with water as aqueous solutions, suspensions or emulsions, or combinations thereof. Such solutions, suspensions or emulsions may be produced from water-soluble, water-suspendible, or emulsifiable formulations or combinations thereof, which are solids, including and usually known as wettable powders or water dispersible granules; or liquids including and usually known as emulsifiable concentrates, aqueous suspensions or suspension concentrates, and aqueous emulsions or emulsions in water, or mixtures thereof such as suspension-emulsions. As will be readily appreciated, any material to which this composition can be added may be used, provided it yields the desired utility without significant interference with the desired activity of the pesticidally active ingredients as pesticidal agents, improves residual lifetime, or decreases the effective concentration required to achieve the pesticidal effect.

Wettable powders, which may be compacted to form water dispersible granules, comprise an intimate mixture of one or more of the pesticidally active ingredients, an inert carrier and surfactants. The concentration of the pesticidally active ingredient in the wettable powder is usually from about 10 percent to about 90 percent by weight based on the total weight of the wettable powder, more preferably about 25 weight percent to about 75 weight percent. In the preparation of wettable powder formulations, the pesticidally active ingredients can be compounded with any finely divided solid, such as prophyllite, talc, chalk, gypsum, Fuller's earth, bentonite, attapulgite, starch, casein, gluten, montmorillonite clays, diatomaceous earths, purified silicates or the like. In such operations, the finely divided carrier and surfactants are typically blended with the compound(s) and milled.

Emulsifiable concentrates of the pesticidally active ingredient comprise a convenient concentration, such as from about 10 weight percent to about 50 weight percent of the pesticidally active ingredient, in a suitable liquid, based on the total weight of the concentrate. The pesticidally active ingredients are dissolved in an inert carrier, which is either a water miscible solvent or a mixture of water-immiscible organic solvents, and emulsifiers. The concentrates may be diluted with water and oil to form spray mixtures in the form of oil-in-water emulsions. Useful organic solvents include aromatics, especially the high-boiling naphthalenic and olefinic portions of petroleum such as heavy aromatic naphtha. Other organic solvents may also be used, such as, for example, terpenic solvents, including rosin derivatives, aliphatic ketones, such as cyclohexanone, and complex alcohols, such as 2-ethoxyethanol.

Emulsifiers which can be advantageously employed herein can be readily determined by those skilled in the art and include various nonionic, anionic, cationic and amphoteric emulsifiers, or a blend of two or more emulsifiers. Examples of nonionic emulsifiers useful in preparing the emulsifiable concentrates include the polyalkylene glycol ethers and condensation products of alkyl and aryl phenols, aliphatic alcohols, aliphatic amines or fatty acids with ethylene oxide, propylene oxides such as the ethoxylated alkyl phenols and carboxylic esters esterified with the polyol or polyoxyalkylene. Cationic emulsifiers include quaternary ammonium compounds and fatty amine salts. Anionic emulsifiers include the oil-soluble salts (e.g., calcium) of alkylaryl sulfonic acids, oil-soluble salts of sulfated polyglycol ethers and appropriate salts of phosphated polyglycol ether.

Representative organic liquids which can be employed in preparing emulsifiable concentrates are the aromatic liquids such as xylene, propyl benzene fractions; or mixed naphthalene fractions, mineral oils, substituted aromatic organic liquids such as dioctyl phthalate; kerosene; dialkyl amides of various fatty acids, particularly the dimethyl amides; and glycol ethers such as the n-butyl ether, ethyl ether or methyl ether of diethylene glycol, and the methyl ether of triethylene glycol and the like. Mixtures of two or more organic liquids may also be employed in the preparation of the emulsifiable concentrate. Organic liquids include xylene, and propyl benzene fractions, with xylene being most preferred in some cases. Surface-active dispersing agents are typically employed in liquid formulations and in an amount of from 0.1 to 20 percent by weight based on the combined weight of the emulsifying agents. The formulations can also contain other compatible additives, for example, plant growth regulators and other biologically active compounds used in agriculture.

Aqueous suspensions comprise suspensions of one or more water-insoluble pesticidally active ingredients dispersed in an aqueous vehicle at a concentration in the range from about 5 to about 50 weight percent, based on the total weight of the aqueous suspension. Suspensions are prepared by finely grinding one or more of the pesticidally active ingredients, and vigorously mixing the ground material into a vehicle comprised of water and surfactants chosen from the same types discussed above. Other components, such as inorganic salts and synthetic or natural gums, may also be added to increase the density and viscosity of the aqueous vehicle. It is often most effective to grind and mix at the same time by preparing the aqueous mixture and homogenizing it in an implement such as a sand mill, ball mill, or piston-type homogenizer.

Aqueous emulsions comprise emulsions of one or more water-insoluble pesticidally active ingredients emulsified in an aqueous vehicle at a concentration typically in the range from about 5 to about 50 weight percent, based on the total weight of the aqueous emulsion. If the pesticidally active ingredient is a solid it must be dissolved in a suitable water-immiscible solvent prior to the preparation of the aqueous emulsion. Emulsions are prepared by emulsifying the liquid pesticidally active ingredient or water-immiscible solution thereof into an aqueous medium typically with inclusion of surfactants that aid in the formation and stabilization of the emulsion as described above. This is often accomplished with the aid of vigorous mixing provided by high shear mixers or homogenizers.

The compositions of the present disclosure can also be granular formulations, which are particularly useful for applications to the soil. Granular formulations usually contain from about 0.5 to about 10 weight percent, based on the total weight of the granular formulation of the pesticidally active ingredient(s), dispersed in an inert carrier which consists entirely or in large part of coarsely divided inert material such as attapulgite, bentonite, diatomite, clay or a similar inexpensive substance. Such formulations are usually prepared by dissolving the pesticidally active ingredients in a suitable solvent and applying it to a granular carrier which has been preformed to the appropriate particle size, in the range of from about 0.5 to about 3 mm. A suitable solvent is a solvent in which the compound is substantially or completely soluble. Such formulations may also be prepared by making a dough or paste of the carrier and the compound and solvent, and crushing and drying to obtain the desired granular particle.

Dusts may be prepared by intimately mixing one or more of the pesticidally active ingredients in powdered form with a suitable dusty agricultural carrier, such as, for example, kaolin clay, ground volcanic rock, talc, ground bark, and the like. Dusts can suitably contain from about 1 to about 10 weight percent of the compounds, based on the total weight of the dust.

The formulations may additionally contain adjuvant surfactants and polymers to enhance adhesion and flowability and decrease dust-off of active ingredients. These adjuvants may optionally be employed as a component of the formulation or as a tank mix. The amount of adjuvant surfactant will typically vary from 0.01 to 1.0 percent by volume, based on a spray-volume of water, preferably 0.05 to 0.5 volume percent. Suitable adjuvant surfactants include, but are not limited to ethoxylated nonyl phenols, ethoxylated synthetic or natural alcohols, salts of the esters of sulfosuccinic acids, ethoxylated organosilicones, ethoxylated fatty amines and blends of surfactants with mineral or vegetable oils. The formulations may also include oil-in-water emulsions such as those disclosed in U.S. patent application Ser. No. 11/495,228, the disclosure of which is expressly incorporated by reference herein.

The formulations may optionally include combinations that contain other pesticidal compounds. Such additional pesticidal compounds may be fungicides, insecticides, nematocides, miticides, arthropodicides, bactericides or combinations thereof that are compatible with the mixtures of the disclosure described herein in the medium selected for application, and not antagonistic to the activity of the present mixtures. Accordingly, in such embodiments, the other pesticidal compound is employed as a supplemental toxicant for the same or for a different pesticidal use. The mixtures of the present disclosure, and the pesticidal compound in the combination can generally be present in a weight ratio of from 1:100 to 100:1.

The term "polymer" or "polymeric material" as used in this disclosure is taken to mean either a single polymer or a combination of different polymers or a copolymer. The particle comprises from about 50% to about 99% by weight of the polymeric material, preferably from about 50% to about 90% by weight.

Examples of suitable polymers for the practice of this disclosure include but are not limited to the following non-exhaustive list of polymers (and copolymers and mixtures thereof): poly(methylmethacrylate); poly(lactic acid) (Chronopols 50, 95, and 100) and copolymers such as poly(lactic acid-glycolic acid) copolymers (Lactel BP-400) and combinations with polystyrene, for example; cellulose acetate butyrate; poly(styrene); hydroxybutyric acid-hydroxyvaleric acid copolymers (Biopol D400G); styrene maleic anhydride copolymers (SMA 1440 A Resin, Sartomer Co.); poly(methylvinyl ether-maleic acid); poly(caprolactone); poly(n-amylmethacrylate); wood rosin; polyanhydrides, e.g., poly(sebacic anhydride), poly(valeric anhydride), poly(trimethylene carbonate), etc., and copolymers such as poly(carboxyphenoxypropane-sebacic acid), poly(fumaric acid-sebacic acid), etc.; polyorthoesters; poly(cyanoacrylates); poly(dioxanone); ethyl cellulose; ethyl vinyl acetate polymers and copolymers; poly(ethylene glycol); poly(vinylpyrrolidone); acetylated mono-, di-, and triglycerides; poly(phosphazene); chlorinated natural rubber; vinyl polymers and copolymers; polyvinyl chloride; hydroxyalkylcelluloses; polybutadiene; polyurethane; vinylidene chloride polymers and copolymers; styrene-butadiene copolymers; styrene-acrylic copolymers; vinyl acetate polymers and copolymers (e.g., vinyl acetate-ethylene copolymers (Vinumuls) and vinyl acetate-vinylpyrrolidone copolymers; alkylvinylether polymers and copolymers; cellulose acetate phthalates; ethyl vinyl pthalates; cellulose triacetate; polyanhydrides; polyglutamates; polyhydroxy butyrates; acrylic polymers (Rhoplexes); alkyl acrylate polymers and copolymers; aryl acrylate polymers and copolymers; aryl methacrylate polymers and copolymers; poly(caprolactams) (i.e., the nitrogen-containing counterparts to caprolactones); epoxy/polyamine epoxy/polyamides; polyvinyl alcohol polymers and copolymers; polyvinyl alcohol polymers and copolymers; silicones; polyesters (for oil-based approaches, including alkyds); phenolics (polymers and copolymers with drying oils).

In one embodiment, the polymer used in the compositions of the present disclosure is selected from the group consisting of poly(methylmethacrylate), poly(lactic acid), poly(lactic acid-glycolic acid) copolymers, cellulose acetate butyrate, poly(styrene), hydroxybutyric acid-hydroxyvaleric acid copolymers, styrene maleic anhydride copolymers, poly(methylvinyl ether-maleic acid), poly(caprolactone), poly(n-amylmethacrylate), wood rosin, polyanhydrides, polyorthoesters, poly(cyanoacrylates), poly(dioxanone), ethyl cellulose, ethyl vinyl acetate polymers, poly(ethylene glycol), poly(vinylpyrrolidone), acetylated mono-, di-, and trigylcerides, poly(phosphazene), chlorinated natural rubber, vinyl polymers, polyvinyl chloride, hydroxyalkylcelluloses, polybutadiene, polyurethane, vinylidene chloride polymers, styrene-butadiene copolymers, styrene-acrylic copolymers, alkylvinylether polymers, cellulose acetate phthalates, ethyl vinyl pthalates, cellulose triacetate, polyanhydrides, polyglutamates, polyhydroxy butyrates, polyvinyl acetate, vinyl acetate-ethylene copolymers, vinyl acetate-vinylpyrrolidone copolymers, acrylic polymers, alkyl acrylate polymers, aryl acrylate polymers, aryl methacrylate polymers, poly(caprolactams), epoxy resins, polyamine epoxy resins, polyamides, polyvinyl alcohol polymers, polyalkyd resins, phenolic resins, abietic acid resins, silicones, polyesters, and copolymers and combinations thereof.

Preferred polymers include poly(methylmethacrylate), poly(lactic acid) (Chronopols 50, 95, or 100), and combinations with polystyrene, poly(lactic acid-glycolic acid) copolymers (Lactel BP-400), cellulose acetate butyrate, and poly(styrene).

Compounds of Formula I are effective in use with plants in a disease-inhibiting and phytologically acceptable amount. The term "disease-inhibiting and phytologically acceptable amount" refers to an amount of a compound that kills or inhibits the plant disease for which control is desired, but is not significantly toxic to the plant. This amount will generally be from about 0.5 to about 500 g ai/100 kg seed. The exact amount of a compound of Formula I required varies with the fungal disease to be controlled, the type of formulation employed, the method of application, the timing of the application, the particular plant species, climate conditions, and the like. The dilution and rate of application will depend upon the type of equipment employed, the method and frequency of application desired and diseases to be controlled.

A compound of Formula I may also be combined with agricultural fungicides to form fungicidal mixtures and synergistic mixtures thereof and be applied to a seed. The fungicidal mixtures are often applied to control a wider variety of undesirable diseases. When used in conjunction with other fungicide(s), a compound of Formula I can be formulated with the other fungicide(s), tank mixed with the other fungicide(s) or applied sequentially with the other fungicide(s) to a seed. Such other fungicides include, ametoctradin, azoxystrobin, *Bacillus subtilis*, benalaxyl, benomyl, benthiavalicarb-isopropyl, bitertanol, bixafen, boscalid, captan, carbendazim, carboxin, carpropamid, chlorothalonil, *Coniothyrium minitans*, copper hydroxide, copper octanoate, copper oxychloride, copper sulfate, copper sulfate (tribasic), cuprous oxide, cyazofamid, cyflufenamid, cyproconazole, cyprodinil, diethofencarb, difenoconazole, dimethomorph, dimoxystrobin, enestrobin, epoxiconazole, ethaboxam, famoxadone, fenamidone, fenarimol, fenbuconazole, fenpiclonil, fluazinam, fludioxonil, flumorph, fluopicolide, fluopyram, fluoxastrobin, fluquinconazole, flusilazole, flutianil, flutolanil, flutriafol, fluxapyroxad, fosetyl, fosetyl-aluminium, guazatine, hexaconazole, hymexazol, imazalil, imazalil sulfate, imibenconazole, iminoctadine, iminoctadine triacetate, ipconazole, ipfenpyrazolone, iprobenfos, iprodione, iprovalicarb, isopyrazam, isotianil, mancozeb, mandipropamid, maneb, metalaxyl, mefenoxam, metalaxyl-M, metconazole, methasulfocarb, methyl iodide, methyl isothiocyanate, metiram, metominostrobin, metrafenone, myclobutanil, ofurace, orysastrobin, oxadixyl, oxine-copper, penconazole, penflufen, penthiopyrad, picoxystrobin, probenazole, prochloraz, procymidone, propamocarb, propamocarb hydrochloride, propiconazole, proquinazid, prothioconazole, pyraclostrobin, pyrametostrobin, pyraoxystrobin, pyrazophos, pyribencarb, pyrimethanil, sedaxane, silthiofam, simeconazole, spiroxamine, tebuconazole, tebufloquin, tetraconazole, thiabendazole, thiophanate-methyl, thiram, tiadinil, tolclofos-methyl, triadimenol, triazoxide, tricyclazole, trifloxystrobin, triticonazole, zoxamide, *Trichoderma* spp., 5-fluorocytosine and profungicides thereof, picolinamide UK-2A and derivatives thereof.

Additionally, a compound of Formula I may be combined with other pesticides, including insecticides, nematocides, miticides, arthropodicides, bactericides or combinations thereof that are compatible with the compound of Formula I in the medium selected for application, and not antagonistic to the activity of the compound of Formula I to form pesticidal mixtures and synergistic mixtures thereof. A compound of Formula I can be applied in conjunction with one or more other pesticides to control a wider variety of undesirable pests. When used in conjunction with other pesticides, the compound of Formula I can be formulated with the other pesticide(s), tank mixed with the other pesticide(s) or applied sequentially with the other pesticide(s) to a seed. Typical insecticides include, but are not limited to: antibiotic insecticides such as allosamidin and thuringiensin; macrocyclic lactone insecticides such as spinosad and spinetoram; avermectin insecticides such as abamectin, doramectin, emamectin, eprinomectin, ivermectin and selamectin; milbemycin insecticides such as lepimectin, milbemectin, milbemycin oxime and moxidectin; carbamate insecticides such as bendiocarb and carbaryl; benzofuranyl methylcarbamate insecticides such as benfuracarb, carbofuran, carbosulfan, decarbofuran and furathiocarb; dimethylcarbamate insecticides dimitan, dimetilan, hyquincarb and pirimicarb; oxime carbamate insecticides such as alanycarb, aldicarb, aldoxycarb, butocarboxim, butoxycarboxim, methomyl, nitrilacarb, oxamyl, tazimcarb, thiocarboxime, thiodicarb and thiofanox; phenyl methylcarbamate insecticides such as allyxycarb, aminocarb, bufencarb, butacarb, carbanolate, cloethocarb, dicresyl, dioxacarb, EMPC, ethiofencarb, fenethacarb, fenobucarb, isoprocarb, methiocarb, metolcarb, mexacarbate, promacyl, promecarb, propoxur, trimethacarb, XMC and xylylcarb; dessicant insecticides such as boric acid, diatomaceous earth and silica gel; diamide insecticides such as chlorantraniliprole, cyantraniliprole and flubendiamide; dinitrophenol insecticides such as dinex, dinoprop, dinosam and DNOC; fluorine insecticides such as barium hexafluorosilicate, cryolite, sodium fluoride, sodium hexafluorosilicate and sulfluramid; formamidine insecticides such as amitraz, chlordimeform, formetanate and formparanate; fumigant insecticides such as acrylonitrile, carbon disulfide, carbon tetrachloride, chloroform, chloropicrin, para-dichlorobenzene, 1,2-dichloropropane, ethyl formate, ethylene dibromide, ethylene dichloride, ethylene oxide, hydrogen cyanide, iodomethane, methyl bromide, methylchloroform, methylene chloride, naphthalene, phosphine, sulfuryl fluoride and tetrachloroethane; inorganic insecticides such as borax, calcium polysulfide, copper oleate, mercurous chloride, potassium thiocyanate and sodium thiocyanate; chitin synthesis inhibitors such as bistrifluron, buprofezin, chlorfluazuron, cyromazine, diflubenzuron, flucycloxuron, flufenoxuron, hexaflumuron, lufenuron, novaluron, noviflumuron, penfluron, tefluben-zuron and triflumuron; juvenile hormone mimics such as epofenonane, fenoxycarb, hydroprene, kinoprene, methoprene, pyriproxyfen and triprene; juvenile hormones such as juvenile hormone I, juvenile hormone II and juvenile hormone III; moulting hormone agonists such as chromafenozide, halofenozide, methoxyfenozide and tebufenozide; moulting hormones such as α-ecdysone and ecdysterone; moulting inhibitors such as diofenolan; precocenes such as precocene I, precocene II and precocene III; unclassified insect growth regulators such as dicyclanil; nereistoxin analogue insecticides such as bensultap, cartap, thiocyclam and thiosultap; nicotinoid insecticides such as flonicamid; nitroguanidine insecticides such as clothianidin, dinotefuran, imidacloprid and thiamethoxam; nitromethylene insecticides such as nitenpyram and nithiazine; pyridylmethyl-amine insecticides such as acetamiprid, imidacloprid, nitenpyram and thiacloprid; organochlorine insecticides such as bromo-DDT, camphechlor, DDT, pp'-DDT, ethyl-DDD, HCH, gamma-HCH, lindane, methoxychlor, pentachlorophenol and TDE; cyclodiene insecticides such as aldrin, bromocyclen, chlorbicyclen, chlordane, chlordecone, dieldrin, dilor, endosulfan, alpha-endosulfan, endrin, HEOD, heptachlor, HHDN, isobenzan, isodrin, kelevan and mirex; organophosphate insecticides such as bromfenvinfos, chlorfenvinphos, crotoxyphos, dichlorvos, dicrotophos, dimethylvinphos, fospirate, heptenophos, methocrotophos, mevinphos, monocrotophos, naled, naftalofos, phosphamidon, propaphos, TEPP and tetrachlorvinphos; organothiophosphate insecticides such as dioxabenzofos, fosmethilan and phenthoate; aliphatic organothiophosphate insecticides such as acethion, amiton, cadusafos, chlorethoxyfos, chlormephos, demephion, demephion-O, demephion-S, demeton, demeton-O, demeton-S, demeton-methyl, demeton-O-methyl, demeton-S-methyl, demeton-S-methylsulphon, disulfoton, ethion, ethoprophos, IPSP, isothioate, malathion, methacrifos, oxydemeton-methyl, oxydeprofos, oxydisulfoton, phorate, sulfotep, terbufos and thiometon; aliphatic amide organothiophosphate insecticides such as amidithion, cyanthoate, dimethoate, ethoate-methyl, formothion, mecarbam, omethoate, prothoate, sophamide and vamidothion; oxime organothiophosphate insecticides such as chlorphoxim, phoxim and phoxim-methyl; heterocyclic organothiophosphate insecticides such as azamethiphos, coumaphos, coumithoate, dioxathion, endothion, menazon, morphothion, phosalone, pyraclofos, pyridaphenthion and quinothion; benzothiopyran organothiophosphate insecticides such as dithicrofos and thicrofos; benzotriazine organothiophosphate insecticides such as azinphos-ethyl and azinphos-methyl; isoindole organothiophosphate insecticides such as dialifos and phosmet; isoxazole organothiophosphate insecticides such as isoxathion and zolaprofos; pyrazolopyrimidine organothiophosphate insecticides such as chlorprazophos and pyrazophos; pyridine organothiophosphate insecticides such as chlorpyrifos and chlorpyrifos-methyl; pyrimidine organothiophosphate insecticides such as butathiofos, diazinon, etrimfos, lirimfos, pirimiphos-ethyl, pirimiphos-methyl, primidophos, pyrimitate and tebupirimfos; quinoxaline organothiophosphate insecticides such as quinalphos and quinalphos-methyl; thiadiazole organothiophosphate insecticides such as athidathion, lythidathion, methidathion and prothidathion; triazole organothiophosphate insecticides such as isazofos and triazophos; phenyl organothiophosphate insecticides such as azothoate, bromophos, bromophos-ethyl, carbophenothion, chlorthiophos, cyanophos, cythioate, dicapthon, dichlofenthion, etaphos, famphur, fenchlorphos, fenitrothion fensulfothion, fenthion, fenthion-ethyl, heterophos, jodfenphos, mesulfenfos, parathion, parathion-methyl, phenkapton, phosnichlor, profenofos, prothiofos, sulprofos, temephos, trichlormetaphos-3 and trifenofos; phosphonate insecticides such as butonate and trichlorfon; phosphonothioate insecticides such as mecarphon; phenyl ethylphosphonothioate insecticides such as fonofos and trichloronat; phenyl phenylphosphonothioate insecticides such as cyanofenphos, EPN and leptophos; phosphoramidate insecticides such as crufomate, fenamiphos, fosthietan, mephosfolan, phosfolan and pirimetaphos; phosphoramidothioate insecticides such as acephate, isocarbophos, isofenphos, isofenphos-methyl, methamidophos and propetamphos; phosphorodiamide insecticides such as dimefox, mazidox, mipafox and schradan; oxadiazine insecticides such as indoxacarb; oxadiazoline insecticides such as metoxadiazone; phthalimide insecticides such as dialifos, phosmet and tetramethrin; pyrazole insecticides such as tebufenpyrad, tolefenpyrad; phenylpyrazole insecticides such as acetoprole, ethiprole, fipronil, pyrafluprole, pyriprole and vaniliprole; pyrethroid ester insecticides such as acrinathrin, allethrin, bioallethrin, barthrin, bifenthrin, bioethanomethrin, cyclethrin, cycloprothrin, cyfluthrin, beta-cyfluthrin, cyhalothrin, gamma-cyhalothrin, lambda-cyhalothrin, cypermethrin, alpha-cypermethrin, beta-cypermethrin, theta-cypermethrin, zeta-cypermethrin, cyphenothrin, deltamethrin, dimefluthrin, dimethrin, empenthrin, fenfluthrin, fenpirithrin, fenpropathrin, fenvalerate, esfenvalerate, flucythrinate, fluvalinate, tau-fluvalinate, furethrin, imiprothrin, meperfluthrin, metofluthrin, permethrin, biopermethrin, transpermethrin, phenothrin, prallethrin, profluthrin, pyresmethrin, resmethrin, bioresmethrin, cismethrin, tefluthrin, terallethrin, tetramethrin, tetramethylfluthrin, tralomethrin and transfluthrin; pyrethroid ether insecticides such as etofenprox, flufenprox, halfenprox, protrifenbute and silafluofen; pyrimidinamine insecticides such as flufenerim and pyrimidifen; pyrrole insecticides such as chlorfenapyr; tetramic acid insecticides such as spirotetramat; tetronic acid insecticides such as spiromesifen; thiourea insecticides such as diafenthiuron; urea insecticides such as flucofuron and sulcofuron; and unclassified insecticides such as closantel, copper naphthenate, crotamiton, EXD, fenazaflor, fenoxacrim, hydramethylnon, isoprothiolane, malonoben, metaflumizone, nifluridide, plifenate, pyridaben, pyridalyl, pyrifluquinazon, rafoxanide, sulfoxaflor, triarathene and triazamate, and any combinations thereof.

Additionally, a compound of Formula I may be combined with herbicides that are compatible with the compound of Formula I in the medium selected for application, and not antagonistic to the activity of the compound of Formula I to form pesticidal mixtures and synergistic mixtures thereof. The compound of Formula I may be applied in conjunction with one or more herbicides to control a wide variety of undesirable plants. When used in conjunction with herbicides, a compound of Formula I may be formulated with the herbicide(s), tank mixed with the herbicide(s) or applied sequentially with the herbicide(s). Typical herbicides may include, but are not limited to: amide herbicides such as allidochlor, beflubutamid, benzadox, benzipram, bromobutide, cafenstrole, CDEA, cyprazole, dimethenamid, dimethenamid-P, diphenamid, epronaz, etnipromid, fentrazamide, flupoxam, fomesafen, halosafen, isocarbamid, isoxaben, napropamide, naptalam, pethoxamid, propyzamide, quinonamid and tebutam; anilide herbicides such as chloranocryl, cisanilide, clomeprop, cypromid, diflufenican, etobenzanid, fenasulam, flufenacet, flufenican, mefenacet, mefluidide, metamifop, monalide, naproanilide, pentanochlor, picolinafen and propanil; arylalanine herbicides such as benzoylprop, flamprop and flamprop-M; chloroacetanilide herbicides such as acetochlor, alachlor, butachlor, butenachlor, delachlor, diethatyl, dimethachlor, metazachlor, metolachlor, S-metolachlor, pretilachlor, propachlor, propisochlor, prynachlor, terbuchlor, thenylchlor and xylachlor; sulfonanilide herbicides such as benzofluor, perfluidone, pyrimisulfan and profluazol; sulfonamide herbicides such as asulam, carbasulam, fenasulam and oryzalin; thioamide herbicides such as chlorthiamid; antibiotic herbicides such as bilanafos; benzoic acid herbicides such as chloramben, dicamba, 2,3,6-TBA and tricamba; pyrimidinyloxybenzoic acid herbicides such as bispyribac and pyriminobac; pyrimidinylthiobenzoic acidherbicides such as pyrithiobac; phthalic acidherbicides such as chlorthal; picolinic acidherbicides such as aminopyralid, clopyralid and picloram; quinolinecarboxylic acidherbicides such as quinclorac and quinmerac; arsenical herbicides such as cacodylic acid, CMA, DSMA, hexaflurate, MAA, MAMA, MSMA, potassium arsenite and sodium arsenite; benzoylcyclohexanedione herbicides such as mesotrione, sulcotrione, tefuryltrione and tembotrione; benzofuranyl alkylsulfonate herbicides such as benfuresate and ethofumesate; benzothiazole herbicides such as benzazolin; carbamate herbicides such as asulam, carboxazole chlorprocarb, dichlormate, fenasulam, karbutilate and terbucarb; carbanilate herbicides such as barban, BCPC, carbasulam, carbetamide, CEPC, chlorbufam, chlorpropham, CPPC, desmedipham, phenisopham, phenmedipham, phenmedipham-ethyl, propham and swep; cyclohexene oxime herbicides such as alloxydim, butroxydim, clethodim, cloproxydim, cycloxydim, profoxydim, sethoxydim, tepraloxydim and tralkoxydim; cyclopropylisoxazole herbicides such as isoxachlortole and isoxaflutole; dicarboximide herbicides such as cinidonethyl, flumezin, flumiclorac, flumioxazin and flumipropyn; dinitroaniline herbicides such as benfluralin, butralin, dinitramine, ethalfluralin, fluchloralin, isopropalin, methalpropalin, nitralin, oryzalin, pendimethalin, prodiamine, profluralin and trifluralin; dinitrophenol herbicides such as dinofenate, dinoprop, dinosam, dinoseb, dinoterb, DNOC, etinofen and medinoterb; diphenyl ether herbicides such as ethoxyfen; nitrophenyl ether herbicides such as acifluorfen, aclonifen, bifenox, chlomethoxyfen, chlornitrofen, etnipromid, fluorodifen, fluoroglycofen, fluoronitrofen, fomesafen, furyloxyfen, halosafen, lactofen, nitrofen, nitrofluorfen and oxyfluorfen; dithiocarbamate herbicides such as dazomet and metam; halogenated aliphatic herbicides such as alorac, chloropon, dalapon, flupropanate, hexachloroacetone, iodomethane, methyl bromide, monochloroacetic acid, SMA and TCA; imidazolinone herbicides such as imazamethabenz, imazamox, imazapic, imazapyr, imazaquin and imazethapyr; inorganic herbicides such as ammonium sulfamate, borax, calcium chlorate, copper sulfate, ferrous sulfate, potassium azide, potassium cyanate, sodium azide, sodium chlorate and sulfuric acid; nitrile herbicides such as bromobonil, bromoxynil, chloroxynil, dichlobenil, iodobonil, ioxynil and pyraclonil; organophosphorus herbicides such as amiprofos-methyl, anilofos, bensulide, bilanafos, butamifos, 2,4-DEP, DMPA, EBEP, fosamine, glufosinate, glufosinate-P, glyphosate and piperophos; phenoxy herbicides such as bromofenoxim, clomeprop, 2,4-DEB, 2,4-DEP, difenopenten, disul, erbon, etnipromid, fenteracol and trifopsime; oxadiazoline herbicides such as methazole, oxadiargyl, oxadiazon; oxazole herbicides such as fenoxasulfone; phenoxyacetic herbicides such as 4-CPA, 2,4-D, 3,4-DA, MCPA, MCPA-thioethyl and 2,4,5-T; phenoxybutyric herbicides such as 4-CPB, 2,4-DB, 3,4-DB, MCPB and 2,4,5-TB; phenoxypropionic herbicides such as cloprop, 4-CPP, dichlorprop, dichlorprop-P, 3,4-DP, fenoprop, mecoprop and mecoprop-P; aryloxyphenoxypropionic herbicides such as chlorazifop, clodinafop, clofop, cyhalofop, diclofop, fenoxaprop, fenoxaprop-P, fenthiaprop, fluazifop, fluazifop-P, haloxyfop, haloxyfop-P, isoxapyrifop, metamifop, propaquizafop, quizalofop, quizalofop-P and trifop; phenylenediamine herbicides such as dinitramine and prodiamine; pyrazole herbicides such as pyroxasulfone; benzoylpyrazole herbicides such as benzofenap, pyrasulfotole, pyrazolynate, pyrazoxyfen, and topramezone; phenylpyrazole herbicides such as fluazolate, nipyraclofen, pioxaden and pyraflufen; pyridazine herbicides such as credazine, pyridafol and pyridate; pyridazinone herbicides such as brompyrazon, chloridazon, dimidazon, flufenpyr, metflurazon, norflurazon, oxapyrazon and pydanon; pyridine herbicides such as aminopyralid, cliodinate, clopyralid, dithiopyr, fluroxypyr, haloxydine, picloram, picolinafen, pyriclor, thiazopyr and triclopyr; pyrimidinediamine herbicides such as iprymidam and tioclorim; quaternary ammonium herbicides such as cyperquat, diethamquat, difenzoquat, diquat, morfamquat and paraquat; thiocarbamate herbicides such as butylate, cycloate, di-allate, EPTC, esprocarb, ethiolate, isopolinate, methiobencarb, molinate, orbencarb, pebulate, prosulfocarb, pyributicarb, sulfallate, thiobencarb, tiocarbazil, tri-allate and vernolate; thiocarbonate herbicides such as dimexano, EXD and proxan; thiourea herbicides such as methiuron; triazine herbicides such as dipropetryn, indaziflam, triaziflam and trihydroxytriazine; chlorotriazine herbicides such as atrazine, chlorazine, cyanazine, cyprazine, eglinazine, ipazine, mesoprazine, procyazine, proglinazine, propazine, sebuthylazine, simazine, terbuthylazine and trietazine; methoxytriazine herbicides such as atraton, methometon, prometon, secbumeton, simeton and terbumeton; methylthiotriazine herbicides such as ametryn, aziprotryne, cyanatryn, desmetryn, dimethametryn, methoprotryne, prometryn, simetryn and terbutryn; triazinone herbicides such as ametridione, amibuzin, hexazinone, isomethiozin, metamitron and metribuzin; triazole herbicides such as amitrole, cafenstrole, epronaz and flupoxam; triazolone herbicides such as amicarbazone, bencarbazone, carfentrazone, flucarbazone, ipfencarbazone, propoxycarbazone, sulfentrazone and thiencarbazone-methyl; triazolopyrimidine herbicides such as cloransulam, diclosulam, florasulam, flumetsulam, metosulam, penoxsulam and pyroxsulam; uracil herbicides such as benzfendizone, bromacil, butafenacil, flupropacil, isocil, lenacil, saflufenacil and terbacil; urea herbicides such as benzthiazuron, cumyluron, cycluron, dichloralurea, diflufenzopyr, isonoruron, isouron, methabenzthiazuron, monisouron and noruron; phenylurea herbicides such as anisuron, buturon, chlorbromuron, chloreturon, chlorotoluron, chloroxuron, daimuron, difenoxuron, dimefuron, diuron, fenuron, fluometuron, fluothiuron, isoproturon, linuron, methiuron, methyldymron, metobenzuron, metobromuron, metoxuron, monolinuron, monuron, neburon, parafluron, phenobenzuron, siduron, tetrafluron and thidiazuron; pyrimidinylsulfonylurea herbicides such as amidosulfuron, azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, metazosulfuron, nicosulfuron, orthosulfamuron, oxasulfuron, primisulfuron, propyrisulfuron, pyrazosulfuron, rimsulfuron, sulfometuron, sulfosulfuron and trifloxysulfuron; triazinylsulfonylurea herbicides such as chlorsulfuron, cinosulfuron, ethametsulfuron, iodosulfuron, metsulfuron, prosulfuron, thifensulfuron, triasulfuron, tribenuron, triflusulfuron and tritosulfuron; thiadiazolylurea herbicides such as buthiuron, ethidimuron, tebuthiuron, thiazafluron and thidiazuron; and unclassified herbicides such as acrolein, allyl alcohol, aminocyclopyrachlor, azafenidin, bentazone, benzobicyclon, bicyclopyrone, buthidazole, calcium cyanamide, cambendichlor, chlorfenac, chlorfenprop, chlorflurazole, chlorflurenol, cinmethylin, clomazone, CPMF, cresol, cyanamide, ortho-dichlorobenzene, dimepiperate, endothal, fluoromidine, fluridone, flurochloridone, flurtamone, fluthiacet, indanofan, methyl isothiocyanate, OCH, oxaziclomefone, pentachlorophenol, pentoxazone, phenylmercury acetate, prosulfalin, pyribenzoxim, pyriftalid, quinoclamine, rhodethanil, sulglycapin, thidiazimin, tridiphane, trimeturon, tripropindan and tritac.

The seed treatment mixture can also comprise or may be applied together and/or sequentially with further active compounds. These further compounds can be plant health stimulants, such as organic compounds, inorganic fertilizers, or micronutrient donors or other preparations that influence plant growth, such as inoculants.

In another embodiment, the seed treatment mixture can also comprise or may be applied together and/or sequentially with other biological organisms, such as, but not limited to the group consisting of *Bacillus* strains, for example *Bacillus subtilis* var. amyloiquefaciens FZB24 (TAEGRP®) and *Bacillus* amyloiquefaciens FZB42 (RHIZOVITAL®), and/or mutants and metabolites of the respective strains that exhibit activity against insects, mites, nematodaes, and/or phytopathogens.

Another embodiment of the present disclosure is a method for the control or prevention of fungal attack. This method comprises applying to the seed a fungicidally effective amount of a compound of Formula I. A compound of Formula I is suitable for treatment of various plants at fungicidal levels, while exhibiting low phytotoxicity. The compound may be useful both in a protectant and/or an eradicant fashion.

Compounds of Formula I have been found to have significant fungicidal effects particularly for agricultural use. Compounds of Formula I are particularly effective for use with agricultural crops and horticultural plants. Additional benefits may include, but are not limited to, improving the health of a plant; improving the yield of a plant (e.g. increased biomass and/or increased content of valuable ingredients); improving the vigor of a plant (e.g. improved plant growth and/or greener leaves); improving the quality of a plant (e.g. improved content or composition of certain ingredients); and improving the tolerance to abiotic and/or biotic stress of the plant.

It will be understood by those in the art that the efficacy of compounds of Formula I for the following fungi establish the general utility of the compounds as fungicides.

Compounds of Formula I have broad ranges of activity against fungal pathogens. Exemplary pathogens may include, but are not limited to, wheat leaf blotch (*Zymoseptoria tritici*), leaf spot of sugar beets (*Cercospora beticola*), leaf spot of peanut (*Cercospora arachidicola* and *Cercosporidium personatum*). The exact amount of the active material to be applied is dependent not only on the specific formulation being applied, but also on the particular action desired, the fungal species to be controlled, and the stage of growth thereof, as well as the part of the plant or other product to be contacted with the compound.

Any range or desired value given herein may be extended or altered without losing the effects sought, as is apparent to the skilled person for an understanding of the teachings herein.

EXAMPLES

Evaluation of Fungicidal Activity as a Seed Treatment for Leaf Blotch of Wheat (*Zymoseptoria tritici*; Bayer code SEPTTR): Seeds of wheat cultivar 'Yuma' were treated with seed dye and a 10% suspension concentrate formulation of compound 1 at rates of 300, 100, 33.3, 11, 3.7, and 0 grams active ingredient/100 kilograms seeds (g ai/100 kg seeds). The treated seeds were planted in pots containing 50% mineral soil/50% soil-less metro mix 12 days after treatment, with 10 seeds per pot, and grown in a greenhouse at 20° C. Four pots of 7-day old seedlings were inoculated with an aqueous spore suspension of *Z. tritici* and after inoculation the plants were kept in 100% relative humidity to permit spores to germinate and infect the leaf. The plants were then transferred to a greenhouse set at 20° C. for disease development.

The activity of various compounds of Formula I when evaluated in these experiments are presented in Table 2. The effectiveness of compounds of Formula I in controlling disease was determined by assessing the severity of disease on treated plants, then converting the severity to percent control based on the level of disease on untreated, inoculated plants.

The test results indicated compound 1 was very active against *Z. tritici*, providing 93% disease control at the 11 gai/100 kg seeds rate.

Control of foliar diseases with these seed treatment applications demonstrates that the experimental compound is taken up into the xylem and redistributed to leaves in an amount sufficient to provide protectant disease control from a seed treatment. Further, there was no evidence of stunting or phytotoxicity from applications of compound 1, even at the highest rates tested. Excellent disease control without phytotoxicity indicates that the classes of chemistry represented by compounds of Formula I have potential utility as seed treatments.

TABLE 1

Biological Activity Rating Scale.

| % Disease Control | Rating |
|---|---|
| 76-100 | A |
| 51-75 | B |
| 26-50 | C |
| 0-25 | D |
| Not Tested | E |

TABLE 2

Foliar Disease Control Of Seed Treatments Utilizing Compounds Of Formula I.

| Cmpd. No.* | $R_1$ | $R_2$ | Rate (g ai/100 kg seeds)* | SEPTTR* |
|---|---|---|---|---|
| 1 | $CH_3$ | $CH_3$ | 300 | A |
|  |  |  | 100 | A |
|  |  |  | 33.3 | A |
|  |  |  | 11 | A |
|  |  |  | 3.7 | D |

Cmpd. No.—Compound Number
*g ai/100 kg seeds—grams active ingredient per 100 kilogram of seeds
SEPTTR—Wheat Leaf Blotch (*Zymoseptoria tritici*)

What is claimed is:

1. A method of treating a plant seed or seedling to control a fungal pathogen disease of a plant grown from the seed or seedling, wherein the method comprises treating the plant seed or seedling with a compound of Formula I,

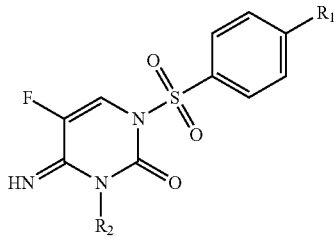

wherein $R_1$ and $R_2$ are each —$CH_3$, wherein the compound of Formula I is applied at a rate from about 11 grams to about 300 grams per 100 kilograms of seed, and wherein the method achieves at least 50% control of the fungal pathogen disease of the plant grown from the seed or seedling.

2. The method of claim 1, wherein the plant seed is a wheat seed (*Triticum* sp.; TRZSS).

3. The method of claim 1, wherein the plant seed or seedling is further treated with one or more additional fungicides.

4. The method of claim 1, wherein the plant seed or seedling is further treated with one or more additional plant health stimulators selected from the group consisting of organic compounds, inorganic fertilizers or micronutrient donors, biocontrol agents and inoculants.

5. The method of claim 1, wherein:
a) the plant seed or seedling is further adapted to eradicate undesirable vegetation and the plant seed or seedling is treated with the compound of Formula I and one or more herbicides, and/or
b) the plant seed or seedling is further adapted to produce a plant resistant to insect attack and the plant seed or seedling is treated with the compound of Formula I and one or more insecticide.

6. The method of claim 1, wherein the fungal pathogen is selected from the group consisting of the causal agent of wheat leaf blotch (Zymoseptoria *tritici*), leaf spot of sugar beets (*Cercospora beticola*), and leaf spot of peanut (*Cercospora arachidicola* and *Cercosporidium* personatum).

7. The method of claim 1, wherein the method controls the fungal pathogen disease without causing significant stunting and/or phytotoxicity.

8. The method of claim 1, wherein the method comprises treating a plant seed to control a fungal pathogen disease of a plant grown from the seed with a compound of Formula I.

9. The method of claim 8, wherein the plant seed is a wheat seed (*Triticum* sp.; TRZSS).

10. The method of claim 8, wherein the compound of Formula I is applied at a rate from about 11 grams to about 300 grams per 100 kilograms of seed.

11. The method of claim 8, wherein the compound of Formula I is applied at a rate of 11 grams per 100 kilograms of seed.

12. The method of claim 8, wherein the compound of Formula I is applied at a rate of 33.3 grams per 100 kilograms of seed.

13. The method of claim 8, wherein the compound of Formula I is applied at a rate of 100 grams per 100 kilograms of seed.

14. The method of claim 8, wherein the compound of Formula I is applied at a rate of 300 grams per 100 kilograms of seed.

15. The method of claim 8, wherein the fungal pathogen is wheat leaf blotch (Zymoseptoria *tritici*).

16. The method of claim 8, wherein the compound of Formula I is applied in a composition which further comprises at least one adjuvant surfactant.

17. The method of claim 8, wherein the method achieves at least 76% control of the fungal pathogen disease of the plant grown from the seed.

18. The method of claim 1, wherein the compound wherein the method comprises treating a plant seedling to control a fungal pathogen disease of a plant grown from the seedling with a compound of Formula I.

19. The method of claim 18, wherein the fungal pathogen is wheat leaf blotch (Zymoseptoria *tritici*).

20. The method of claim 18, wherein the compound of Formula I is applied in a composition which further comprises at least one adjuvant surfactant.

* * * * *